(12) United States Patent
Imai

(10) Patent No.: US 6,758,433 B2
(45) Date of Patent: Jul. 6, 2004

(54) REEL

(75) Inventor: Fumihito Imai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 32 days.

(21) Appl. No.: 10/322,653

(22) Filed: Dec. 19, 2002

(65) Prior Publication Data

US 2003/0122030 A1 Jul. 3, 2003

(30) Foreign Application Priority Data

Dec. 28, 2001 (JP) ........................................ 2001-399521

(51) Int. Cl.$^7$ .............................................. B65H 75/28
(52) U.S. Cl. .................................. 242/586.6; 242/332.7
(58) Field of Search ......................... 242/332.7, 332.8, 242/530.2, 530.1, 586.5, 586.6

(56) References Cited

U.S. PATENT DOCUMENTS

| | | | | |
|---|---|---|---|---|
| 1,322,114 A | * | 11/1919 | Jenkins | 242/586.6 |
| 1,346,356 A | * | 7/1920 | William | 242/586.5 |
| 1,353,004 A | * | 9/1920 | Joseph | 242/586.6 |
| 1,386,839 A | * | 8/1921 | Chase | 242/586.6 |
| 1,389,500 A | * | 8/1921 | Goodrich et al. | 242/586.6 |
| 1,421,933 A | * | 7/1922 | Edward | 242/586.6 |
| 2,022,807 A | * | 12/1935 | Hagerty | 242/586.6 |
| 2,065,299 A | * | 12/1936 | Rawson | 242/586.6 |
| 2,225,433 A | * | 12/1940 | Emanuel | 242/332.7 |
| 3,099,415 A | * | 7/1963 | Hiroshi | 242/586.5 |
| 3,837,596 A | * | 9/1974 | Lagergren | 242/586.5 |
| 4,426,047 A | | 1/1984 | Richard et al. | |

* cited by examiner

Primary Examiner—William A. Rivera
(74) Attorney, Agent, or Firm—Sughrue Mion, PLLC

(57) ABSTRACT

A reel including a hub around which a recording tape is to be wound and a spring, which is attached to the hub, is disclosed. Winding of the recording tape causes the spring to wound around the hub. In a cartridge for containing the reel, an exterior of uneven portions, such as a recess for receiving a leader pin or a corner of the spring, is covered by the spring. The recording tape is wound on a peripheral surface of the spring without directly contacting the uneven portions.

20 Claims, 14 Drawing Sheets

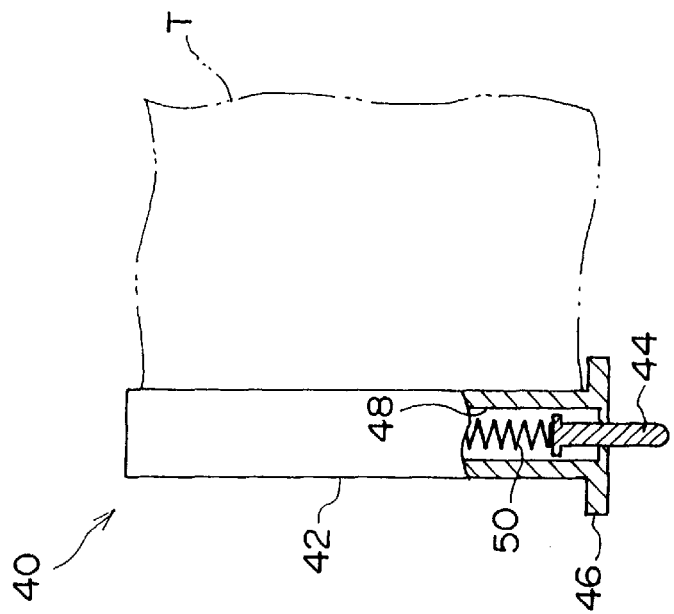
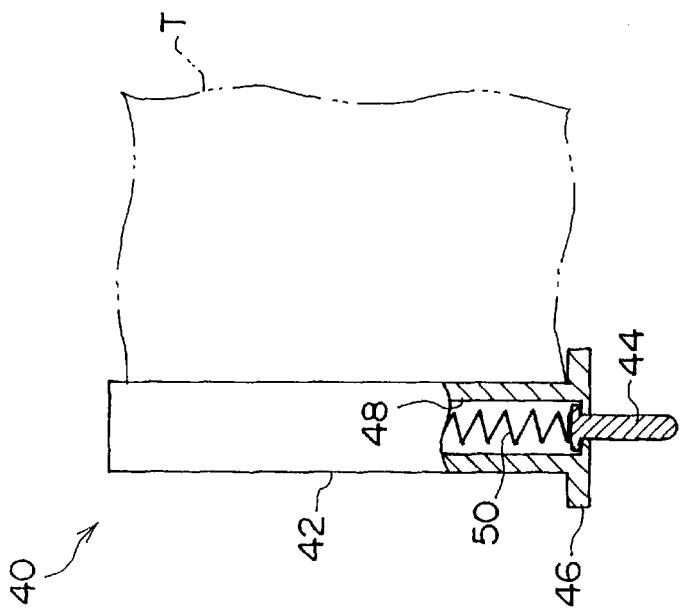

FOLD   FOLD

DEFORMATION WITH A
LARGE CURVATURE

REEL

BACKGROUND OF THE INVENTION

1. Technical Field

The present invention relates to a reel around which a recording tape is wound.

2. Description of the Related Art

Recording tapes such as magnetic tapes are used as an external recording medium for computers and the like. Prevention of dust adhesion and a smaller storage space are preferred because the recording tapes are generally used for back-up of large volumes of information owing to their large recording capacities.

For the above reason, a recording tape cartridge with a case and a single reel around which a recording tape is wound and which is rotatably contained in the case is adopted. This type of cartridge can prevent adhesion of dust to the recording tape. In addition, this recording tape cartridge almost halves a storage space compared with a structure with a second reel for retracting the recording tape when recording or reproducing information recorded on the recording tape.

Among recording tape cartridges, a recording tape cartridge including a leader block fixed to a leading or free end of a recording tape directly or by a leader tape is known. The leader block is retained outwardly around an opening formed in the case for drawing the recording tape. The leader block functions both as an operational member for drawing the recording tape from the case, and as a blocking member for blocking the opening through which the recording tape is drawn.

This recording tape cartridge is loaded in a tape drive system when recording information on the recording tape or reproducing information recorded on the recording tape. In the drive system loaded with the recording tape cartridge, a drawing device operates the leader block to draw the recording tape from the case, and to guide the recording tape to a predetermined position on a tape path, thereby holding the leader block in the hub (reel hub) of a machine reel (take-up reel).

As shown in FIG. 17A, a leader block 106 has, at a longitudinal direction center thereof, a recess 100, in which the leading end of a recording tape 104 is fixed by a clamp pin 102. The leader block 106 is retained in an insertion portion 112 formed in a hub 110 of a machine reel 108 (hereinafter referred to as reel 108). An end of the leader block 106 positioned at an opening end of the insertion portion 112 has an arc-shaped, curved surface 116, which corresponds to a periphery 114 of the hub 110. The curved surface 116 of the leader block 106, together with the periphery 114, forms a retracting surface 118, which is substantially circular when viewed in an axial direction of the reel 108, for retracting the recording tape 104. Under these conditions, as the reel 108 (hub 110) of the drive system is rotationally driven, the recording tape 104 is wound on the retracting surface 118.

However, in the conventional leader block 106, the curved surface 116, which is formed at the longitudinal direction end thereof, and constitutes a portion of the retracting surface 118, has a short arc length. In other words, as shown in FIG. 17A, a projection "a", a projecting distance in a diametrical direction of the curved surface 116 from an edge of the opening of the insertion portion 112 is small. As a result, as shown in FIG. 17B, the curved surface 116 may be positioned within the insertion portion 112 without projecting from therefrom merely due to the leader block being slightly dislocated in the insertion portion 112.

In such an event, a fold or deformation may be formed on the recording tape 104 at the edge of the opening of the insertion portion 112. Folds will be similarly formed on subsequent layers of the recording tape 104 wound over the edge portion. The portions of the recording tape 104 where the folds are formed are substantially recording areas. Since the folded portions cannot maintain a proper distance from a recording-reproducing head during the process of recording or reproducing information, and such areas may cause generation of areas incapable of having information recorded thereon or loss of recorded information.

If the leader block 106 is slightly dislocated in the insertion portion 112 and the curved surface 116 protrudes from the periphery 114 of the hub 110, as shown in FIG. 17C, the recording tape 104 is wound with deformation at a larger curvature than a predetermined winding curvature, along the short area of the projected part (uneven portion) formed on the retracting surface 118 because the arc length of the curved surface 116 is short. Like the folds, such a deformation will deform the subsequent layers of the recording tape 104 wound over the projected part, thereby causing generation of areas incapable of having information recorded or loss of recorded information.

Even if a leader pin, rather than the leader block, is fixed to the leading end of the recording tape, a drawing device of the tape drive system operates the leader pin to draw the recording tape from the case, the leading end of the recording tape is fixed by a clamp portion of the hub, and the recording tape is wound by the rotation of the machine reel, the clamp portion will make an uneven portion and cause similar problems as mentioned above.

Moreover, even a reel contained in a case has a similar problem when the clamp member for clamping the leading end of the recording tape on the body of the hub is excessively inserted into the insertion portion of the hub or excessively projected out from the insertion portion to make an uneven portion.

SUMMARY OF THE INVENTION

In light of the foregoing, an object of the present invention is to provide a reel, which can prevent a recording tape from having an uneven portion, thereby preventing generation of an area incapable of having information recorded thereon or loss of recorded information.

The present inventor has noticed that even when an uneven portion is formed on a clamp portion, an uneven portion is not formed on the recording tape once the tape is wound to a certain number of layers. The reel is necessarily driven to wind the recording tape. The inventor has also conceived that the uneven portion can be removed during the driving of the reel, and thus completed the present invention.

According to the present invention, in a reel having a hub around which a recording tape is wound, a flexible member is attached to the hub. The flexible member is wound on the periphery of the hub by the recording tape to cover a clamp portion of the hub.

Because the flexible member is necessarily wound with the winding of the recording tape, the recording tape wound on the periphery of the flexible member does not come into contact with the clamp portion of the hub and consequently does not come into contact with the uneven portion formed at the clamp portion. Accordingly, it is possible to prevent occurrence of a tape deformation on the recording tape wound around the reel, thereby preventing generation of an area incapable of having information recorded thereon or loss of recorded information.

BRIEF DESCRIPTION OF THE DRAWINGS

FIG. 11A is a sectional side view of a leader pin showing a state in which a leg portion thereof is extended from a body thereof.

FIG. 11B is a sectional side view of the leader pin showing a state in which the leg portion thereof is retracted into a body thereof.

DESCRIPTION OF THE PREFERRED EMBODIMENTS

Figure 1:
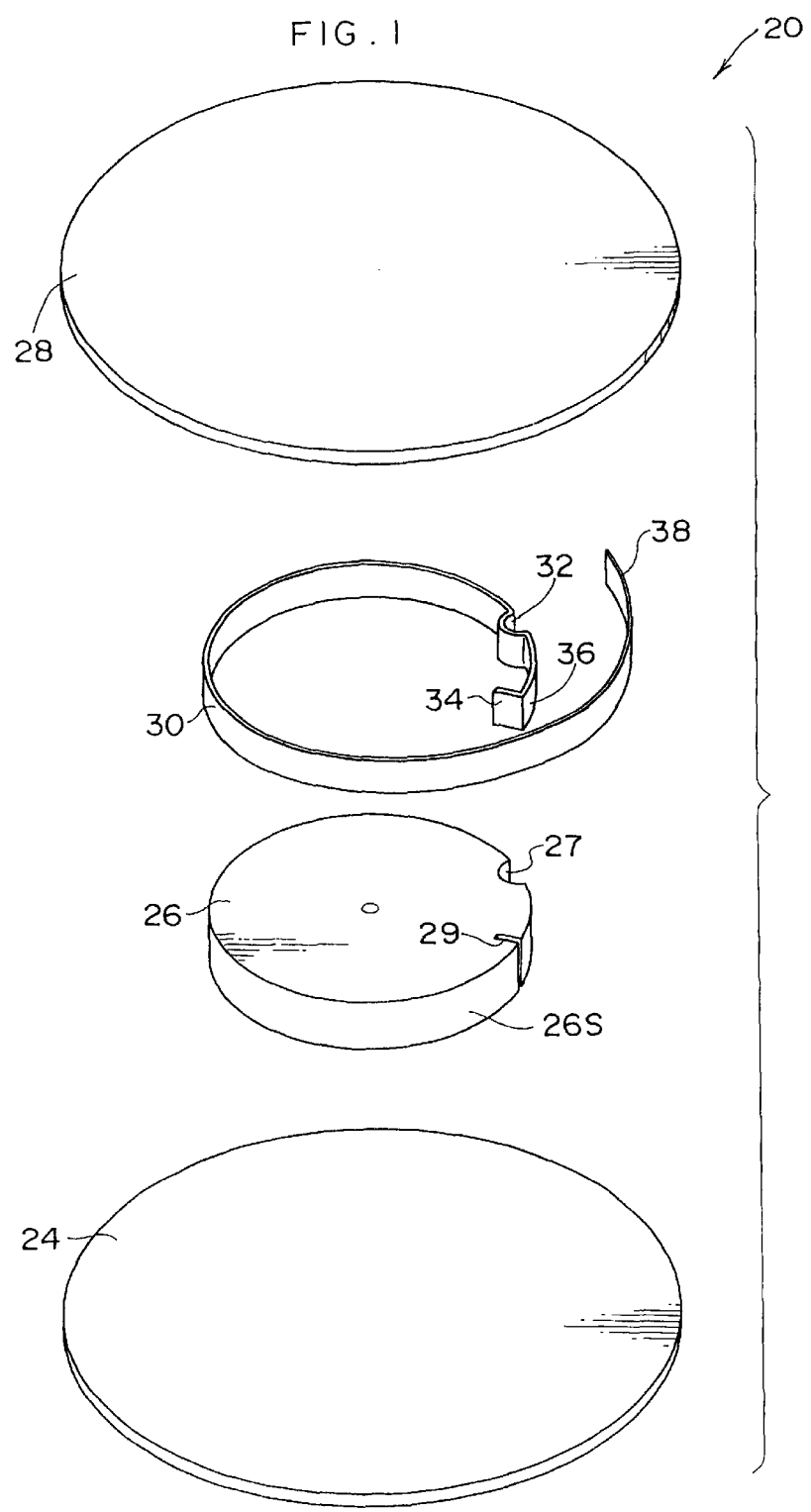
FIG. 1 is a development view of a reel according to a first embodiment of the present invention.

Preferred embodiments of the present invention will now be explained.

First Embodiment

According to a first embodiment of the present invention, a reel is mounted to a drive system as a machine reel. The drive system is loaded with a magnetic tape cartridge containing a single reel. In the drive system, a machine reel 20 (see FIG. 1; hereinafter referred to as reel 20) for winding and unwinding a recording tape T is pivotably supported so as to be freely rotatable.

The reel 20 comprises a lower flange 24, a hub 26 fixed onto the lower flange 24, an upper flange 28 removably attached to the hub 26, and a power spring 30. The spring 30 is attached to the hub 26, and can be wound on a periphery 26S of the hub 26. The spring 30 is an example of a flexible member.

The hub 26 has a recess 27 formed thereon. The spring 30 has a receiving recess 32 formed therein corresponding to the recess 27. A leader pin 40 is drawn by a drawing device provided in the drive system, and is received in the receiving recess 32.

In addition, the hub 26 has an insertion slot 29 into which a base end portion 34 of the power spring 30 is inserted. In order to insert the base end portion 34 into the insertion slot 29, the power spring 30 is bent to form a corner portion 36.

Figure 3:
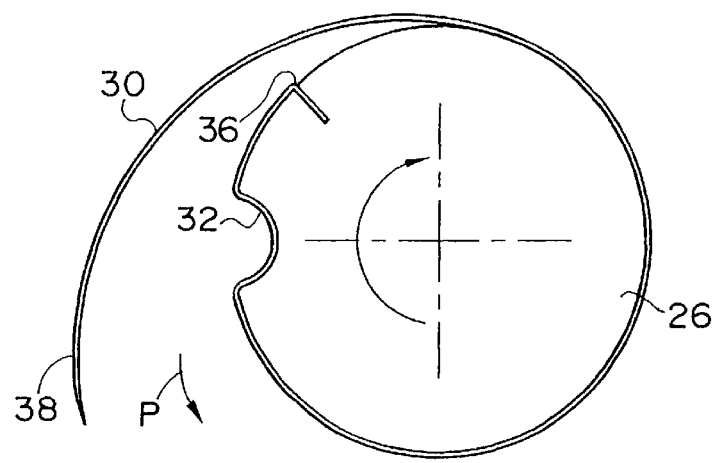
FIG. 3 is a plan view of the first embodiment of the present invention showing a state in which a leader pin is not retained in a reel.

In the state in which the power spring 30 is wound around the hub 26 by the magnetic tape T, a length of the power spring 30 is determined to allow a leading end 38 of the power spring 30 to be positioned beyond the corner portion 36 and the receiving recess 32 in a tape winding direction (direction P in FIG. 3), i.e., a direction opposite to a rotation direction of the reel 20.

Figure 2:
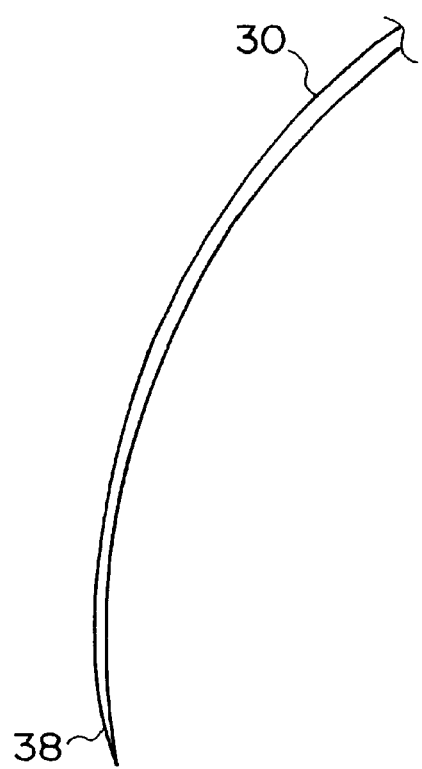
FIG. 2 is a partial enlarged plan view of a leading end of a power spring.

The leading end 38 of the power spring 30 is ground to be gradually thinner toward an end thereof so as not to form an uneven portion when the magnetic tape T is wound on the leading end 38 (see FIG. 2). The grinding process is carefully performed not to form a burr on the leading end 38.

The reel can be made with the upper flange and the lower flange formed integrally with the hub or separately therefrom. Further, as long as the recording tape is well wound on the periphery of the hub, the reel may be provided with only one of the upper flange and the lower flange. The reel may also be provided with neither the upper flange nor the lower flange.

The reel may be a machine reel provided within a drive system in which a magnetic tape cartridge is loaded. Alternatively, the reel can be mounted within the magnetic tape cartridge.

When an uneven portion is formed on the periphery of the hub around which the recording tape is wound, the length of the flexible member is adjusted so that the flexible member wound around the hub can fully cover the uneven portion. Thus, it is possible to prevent a tape deformation from being caused by the uneven portion.

The leading end of the flexible member becomes gradually thinner toward the end of the flexible member in order to prevent formation of an uneven portion at a portion of the recording tape which contacts an exterior of the leading end. Accordingly, the leading end prevents an uneven portion from being formed on layers of the recording tape wound over the portion of the recording tape contacting the leading end.

An operation of the first embodiment will now be explained.

In a state in which the drive system having the above-described structure is not loaded with the magnetic tape cartridge, the receiving recess 32 of the power spring 30 is received in the recess 27 of the hub 26. The leading end 38 of the power spring 30 is disposed slightly apart from the hub 26 to allow the leader pin 40 to be conveyed to the receiving recess 32 by the drawing device (see FIG. 3). At this point, the upper flange is not yet fixed to the reel 20.

Figure 4:
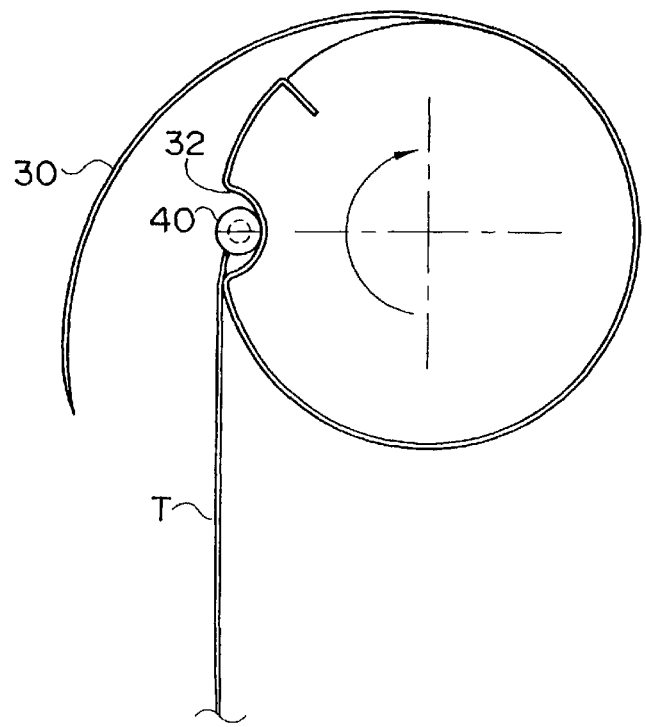
FIG. 4 is a plan view of the first embodiment of the present invention showing a state in which the leader pin is retained in a recess of the reel.
Figure 5:
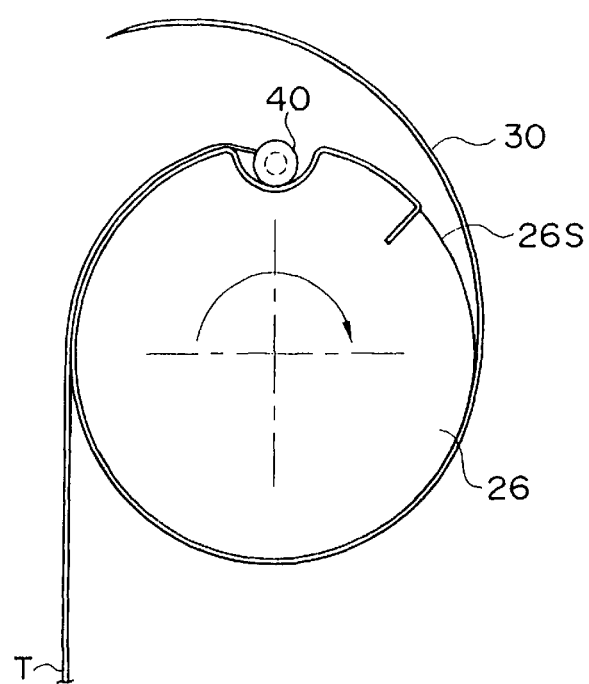
FIG. 5 is a plan view showing the winding of the recording tape around the reel when the reel in the state illustrated in FIG. 4 begins to rotate.
Figure 6:
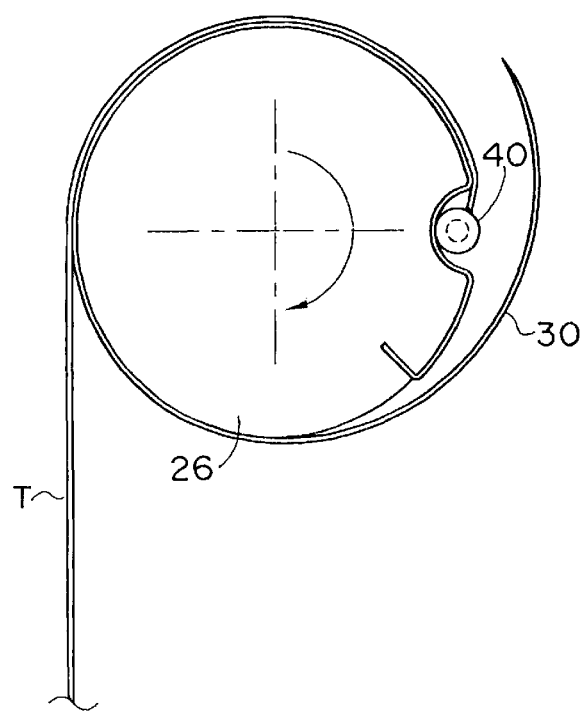
FIG. 6 is a plan view showing the winding of the recording tape around the reel when the rotation of the reel proceeds from the state illustrated in FIG. 5.
Figure 7:
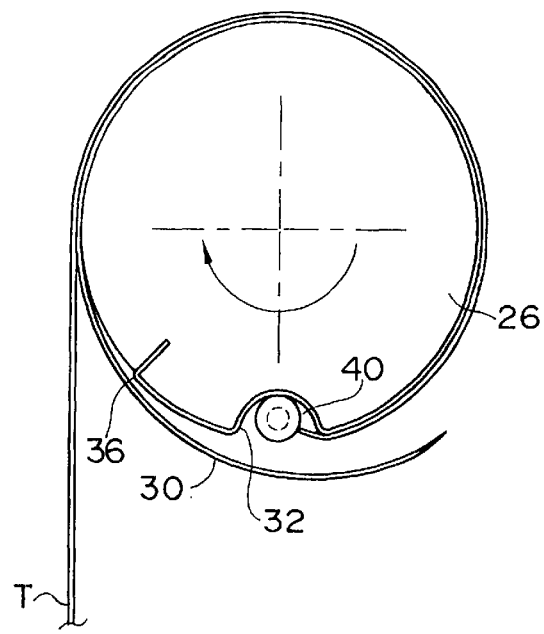
FIG. 7 is a plan view showing the winding of the recording tape around the reel when the rotation of the reel proceeds from the state illustrated in FIG. 6.
Figure 8:
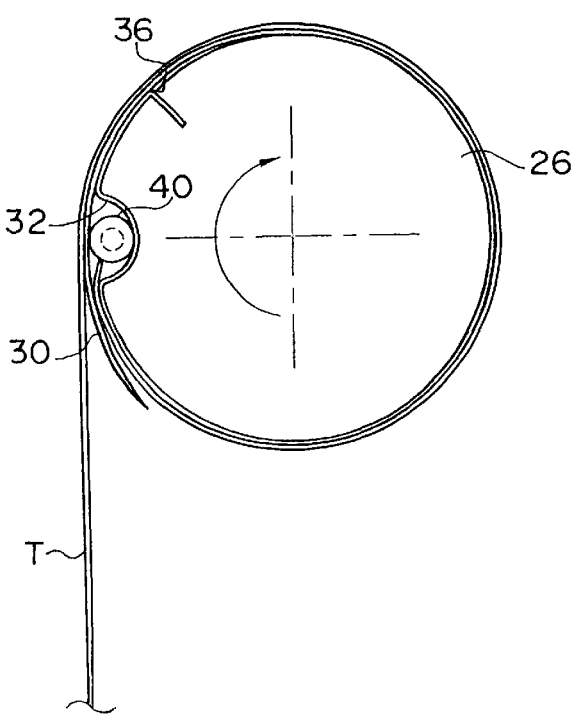
FIG. 8 is a plan view showing the winding of the recording tape around the reel when the rotation of the reel proceeds from the state illustrated in FIG. 7.

When the magnetic tape cartridge is loaded in the drive system and the leader pin 40 is drawn by the drawing device (for example, an arm or a cam), the leader pin 40 is conveyed to and held in the receiving recess 32 (see FIG. 4).

In the drive system, the upper flange 28 is fixed to an upper surface of the hub 26 by a cam or the like. It is also possible to provide the system without the upper flange 28.

As the reel 20 begins to rotate, the leader pin 40 also moves in the rotation direction of the reel 20 (see FIGS. 5 through 8).

Figure 9:
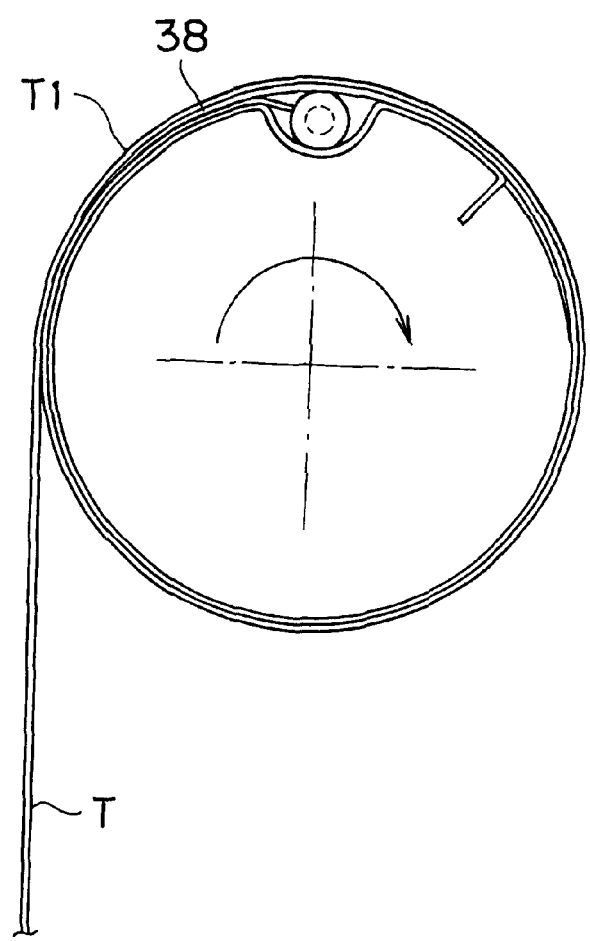
FIG. 9 is a plan view showing the winding of the recording tape around the reel when the rotation of the reel proceeds from the state illustrated in FIG. 8.

As the reel 20 further rotates, the leading end 38 of the power spring 30 is forced toward the periphery of the hub 26 by the magnetic tape T wound on the exterior of the power spring 30. When the reel 20 has made about one rotation, the leading end 38 is brought into contact with the outer surface of the wound magnetic tape T (see FIG. 9).

With further rotation of the reel 20, the magnetic tape T is wound on the outer surface of the leading end 38. Because the leading end 38 becomes gradually thinner toward the end thereof, an uneven portion is not formed on a portion T1 of the magnetic tape T, which contacts the outer surface of the leading end 38. Thus, it is possible to prevent an uneven portion from being generated on layers of the recording tape wound over the portion T1.

As explained above, in the first embodiment, the power spring 30 is wound around the hub 26 by the magnetic tape T. An exterior portion of the corner portion 36, which is bent to be inserted into the hub 26, and an exterior portion of the receiving recess 32 for receiving the leader pin 40 are covered by the power spring 30, and the recording tape T is wound on the outside of the power spring 30. Accordingly, even if an uneven portion is formed due to the corner portion 36 or the receiving recess 32, it does not generate a fold on the magnetic tape T.

The leading end 38 of the power spring 30 is ground to be gradually thinner toward the end. It is however possible to use a thin spring, which does not require a grinding process.

EXAMPLE

The following example illustrates the first embodiment more in detail.

According to this example, the reel 20 comprises the hub 26 which is integrally engaged with the lower flange 24 and an upper flange fixed to the hub (see FIG. 1). On the upper surface of the lower flange 24, a groove 25 having a substantial fan shape, which is gradually narrowed toward the receiving recess from the periphery of the lower flange 24, is formed to guide the leader pin 40 to the receiving recess 32 (see FIG. 10).

Figure 10:
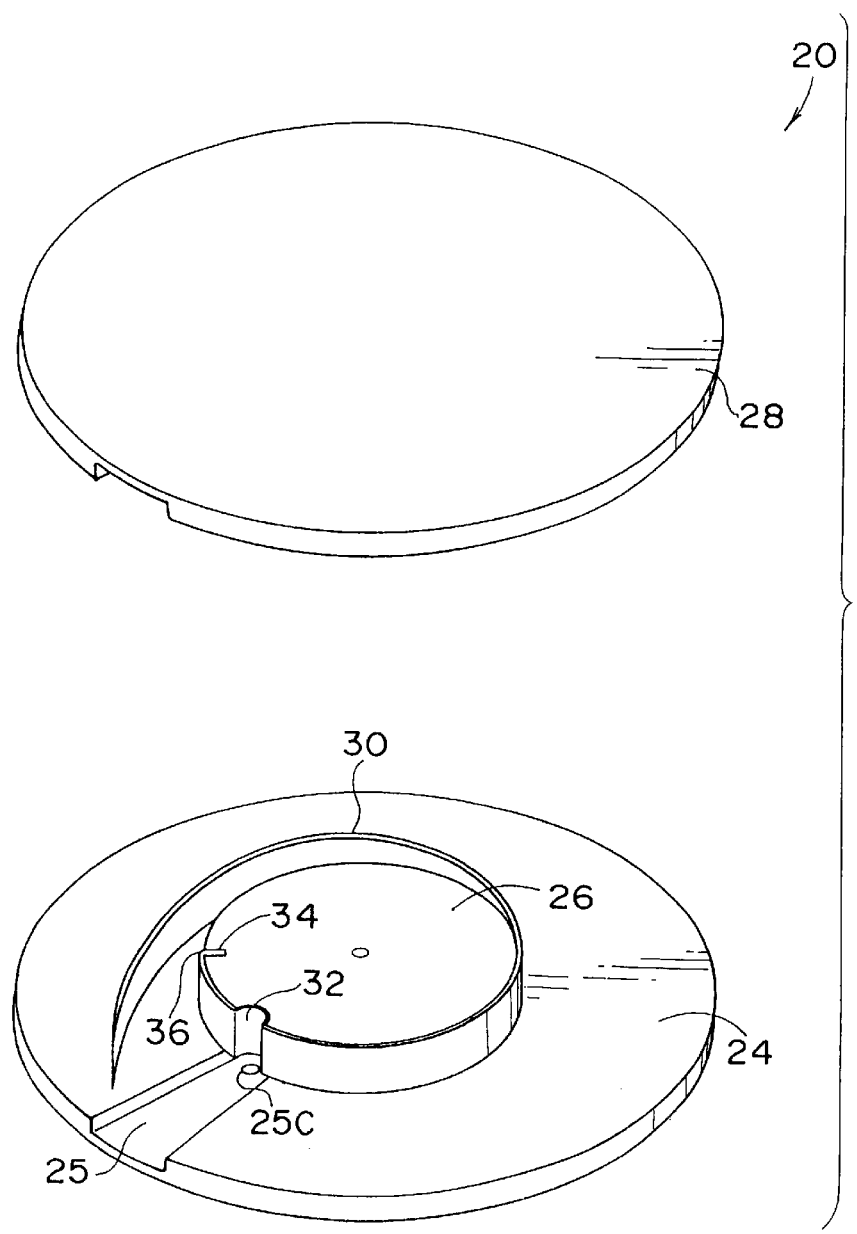
FIG. 10 is a development view showing a reel of another embodiment of the present invention.

The leader pin 40 has a body 42 to which a leading end of the magnetic tape T is fixed, and a leg portion 44, which has a small diameter and is capable of extending from and retracting into the body 42 (see FIGS. 11A and 11B). The groove 25 has a leg engagement recess 25C at the narrowest part thereof, which is below the receiving recess 32 (FIG. 10).

The leader pin body 42 has a flange portion 48 at a lower end thereof. When the leader pin 40 is attached to the reel 20, an upper surface of the flange portion 48 comes into contact with an lower surface of the hub 26.

The leader pin body 42 includes a receiving chamber 48 for receiving a compressed coil spring 50. The leg portion 44 is urged downward by the compressed coil spring 50.

Operation of this example will now be explained.

When the magnetic tape cartridge is loaded in the drive system and the leader pin 40 is drawn by the drawing device, the leader pin 40 is conveyed to an entrance of the groove 25.

The leader pin 40 is conveyed to the receiving recess 32, with the leg portion 44 being pressed from the bottom and the compressed coil spring 50 being contracted, that is, with the leg portion 44 being slightly retracted into the leader pin body 42 (see FIG. 11B).

Figure 12A:
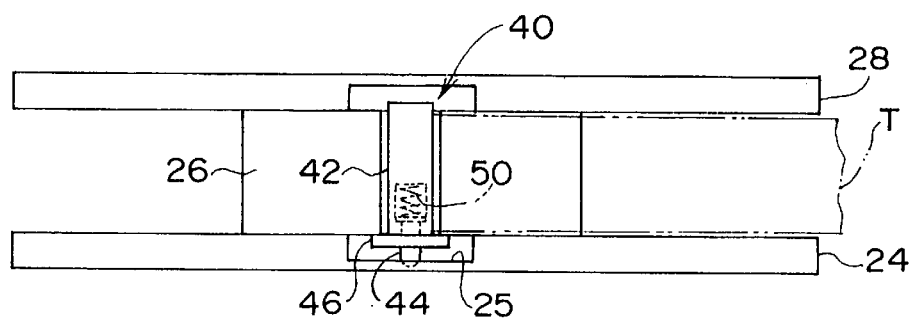
FIG. 12A is a side view showing the leader pin being held in the reel, without showing the power spring.
Figure 12B:
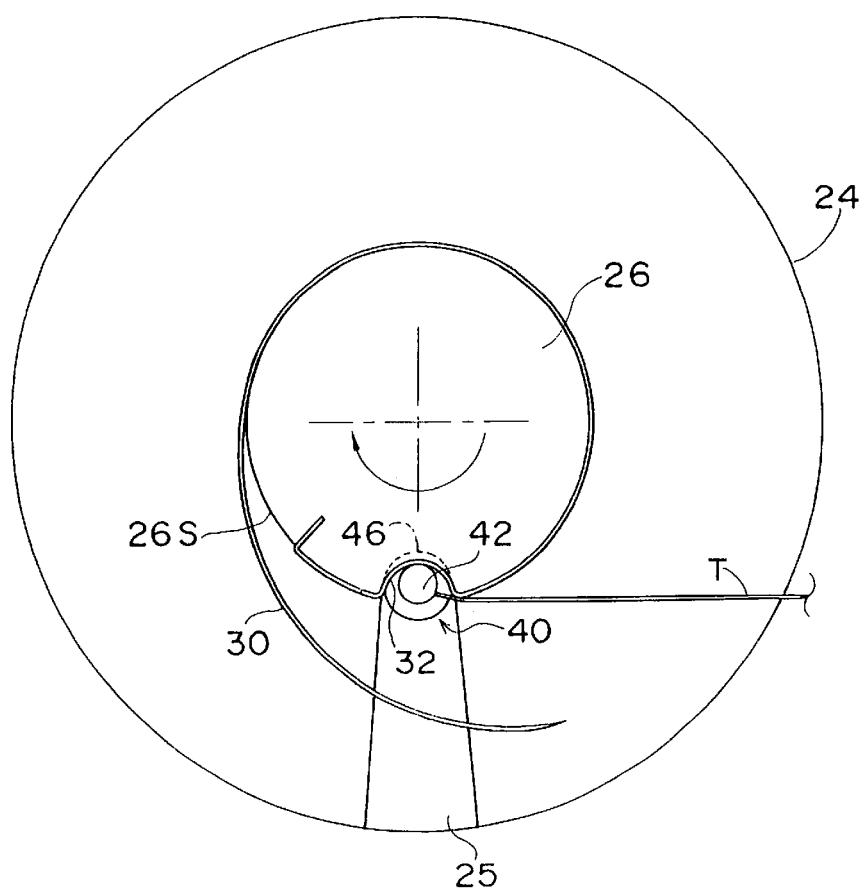
FIG. 12B is a plan view showing the leader pin being held in the reel, without showing an upper flange.

When the leg portion 44 is released from the pressure, the leg portion 44 is projected from the leader pin body so that a leading end thereof can be inserted into the leg engagement recess 25C. At the same time, the upper surface of the flange portion 46 comes into contact with the lower surface of the hub 26. The leader pin 40 is thus retained in the reel 20 (see FIG. 12A).

As the reel 20 begins to rotate, the leader pin 40 moves in the rotation direction of the reel 2 (see FIGS. 4 through 9).

As the reel 20 further rotates, the magnetic tape T is wound on the outer surface of the leading end 38. Because the leading end 38 becomes gradually thinner toward the end thereof, an uneven portion is not formed on the portion T1 of the magnetic tape, which contacts the outer surface of the leading end 38. Thus, it is possible to prevent an uneven portion from being generated on the layers of the recording tape wound over the portion T1 (see FIG. 9).

In the example described above, the leader pin 40 can be easily attached to or detached from the reel 20.

Second Embodiment

According to a second embodiment of the present invention, a single reel is provided in a magnetic tape cartridge. A loading direction P1 (indicated by arrow P1 in FIG. 13) of the magnetic tape cartridge into the drive system is the forward direction, and front, rear, left, right, upward and downward directions used herein are determined according to a perspective in direction P1. In the explanation of the second embodiment, elements common to the first embodiment are provided with the same reference numerals as used in the first embodiment.

Figure 13:
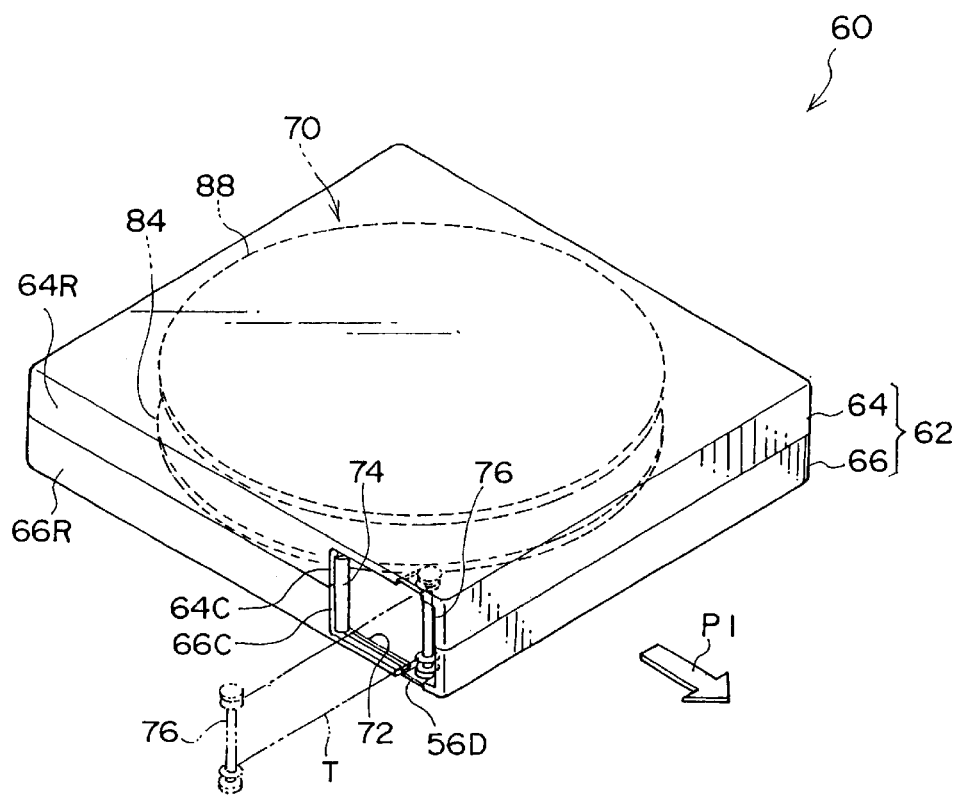
FIG. 13 is a perspective view of a magnetic tape cartridge according to a second embodiment of the present invention.

As shown in FIG. 13, a case 62 of a magnetic tape cartridge 60 (herein after referred to as cartridge 60) is formed in a rectangular-box shape by fixing to each other respective outer peripheral walls of an upper case 64 and a lower case 66, both of which are made of a synthetic resin. A single reel 70 around which a magnetic tape T is wound, is rotatably contained in the case 62. The reel 70 is urged downward by a spring (not shown) mounted between the upper case 64 and the reel 70, and capable of moving up and down.

A right wall (peripheral wall on the right side) 64R of the upper case 64 and a right wall (peripheral wall on the right side) 66R of the lower case 66 respectively have substantially rectangular notches 64C and 66C at front portions thereof, thereby forming an opening 72.

A shutter member 74 for opening and closing the opening 72 is provided at the inner sides of the right walls 64R, 66R. The opening 72 is for drawing out the magnetic tape T, which is wound around the reel 70, from the cartridge 60. When the cartridge 60 is not in use (that is, not loaded in the drive system), the opening 72 is closed by the shutter member 74. When the cartridge 60 is in use (that is, loaded in the drive system), the shutter member 74 is opened to draw a leader pin 76 fixed to the leading end of the magnetic tape T. The lower case 66 has a recess 56D for receiving the leader pin 76 while allowing drawing of the leader pin. The upper case 64 similarly has a recess.

The reel 70 comprises a lower flange 84, a hub 86 (see FIGS. 14 through 16) integrally fixed to the lower flange 84, an upper flange 88 fixed to the hub 86, and a power spring 90 fixed to the hub 86 and wound on the periphery of the hub 86.

Figure 14:
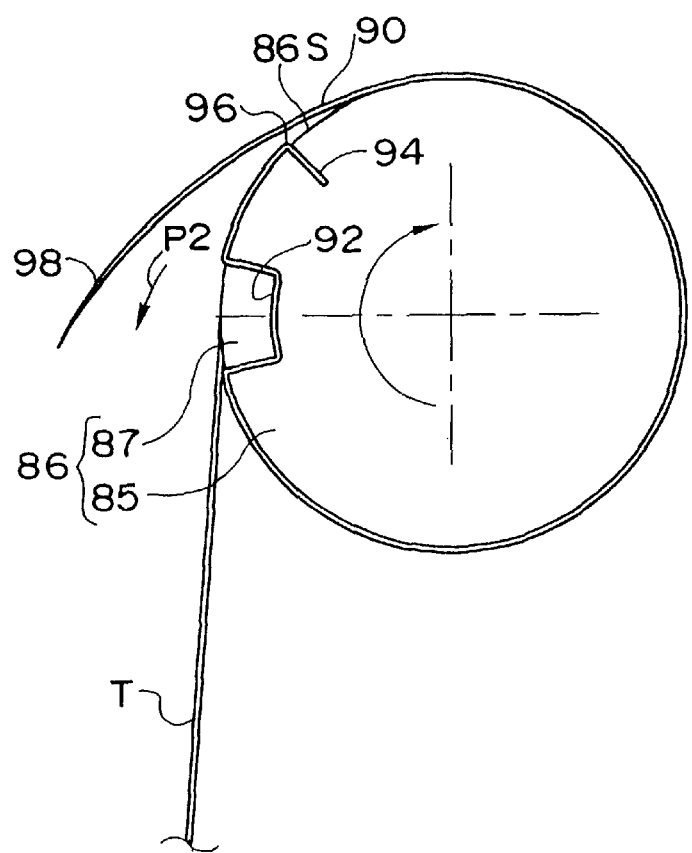
FIG. 14 is a plan view showing the state immediately before rotation of a reel commences, according to the second embodiment of the invention.
Figure 15:
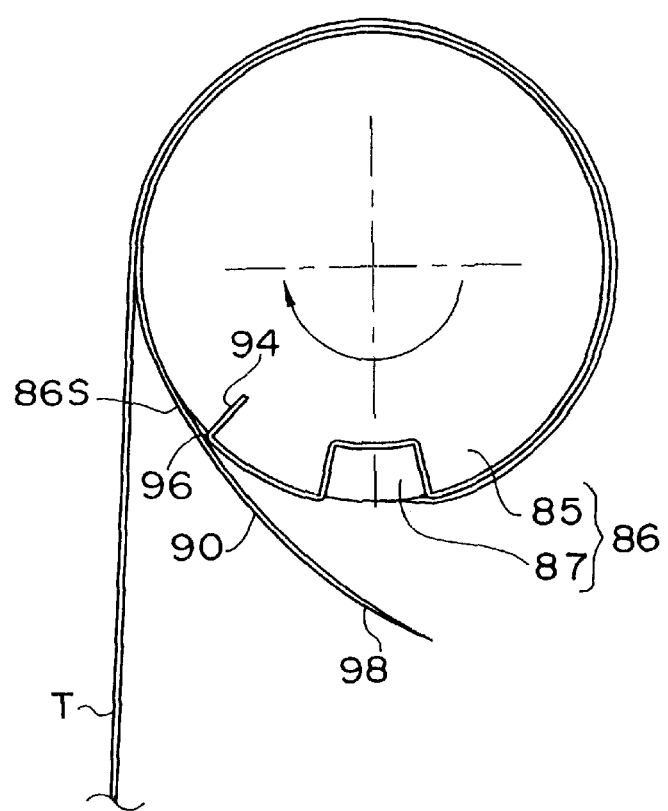
FIG. 15 is a plan view showing the winding of the recording tape around the reel as the reel is rotated from the state illustrated in FIG. 14.
Figure 16:
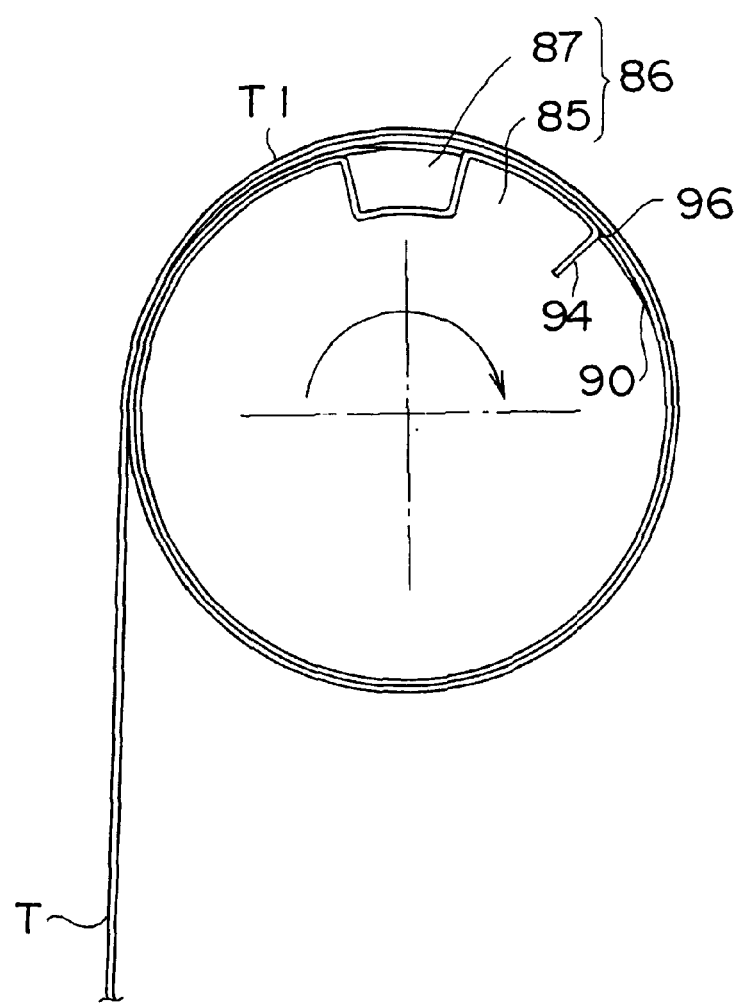
FIG. 16 is a plan view showing the winding of the recording tape around the reel as the reel is further rotated from the state illustrated in FIG. 15.
Figure 17A:
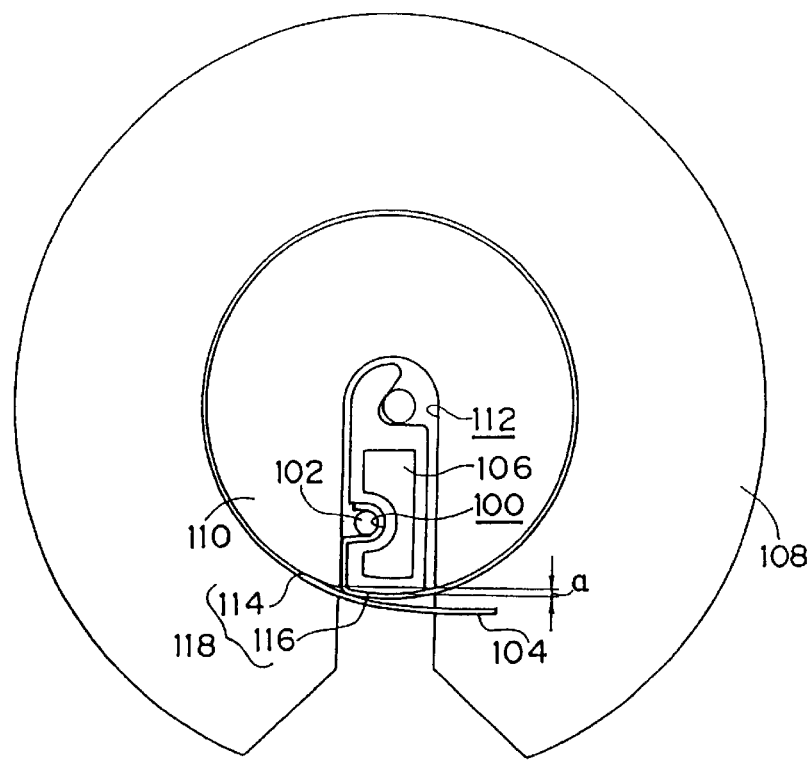
FIG. 17A is a plan view of a conventional reel.
Figure 17B:
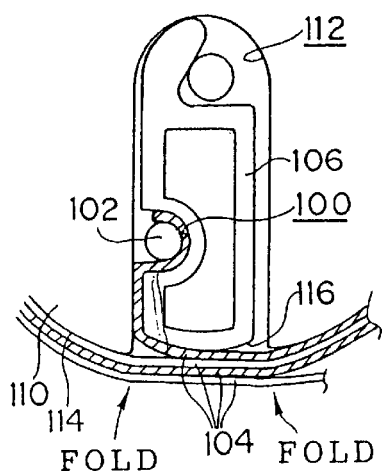
FIG. 17B is a partial enlarged plan view of the conventional reel with a leader block excessively inserted.
Figure 17C:
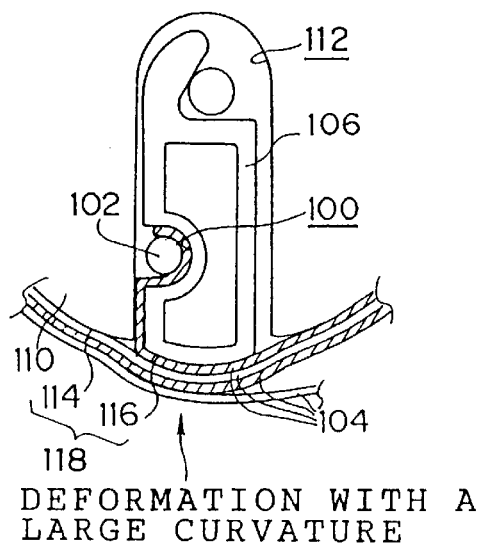
FIG. 17C is a partial enlarged plan view of the conventional reel with the leader block excessively projected.

As shown in FIGS. 14 through 16, the hub 86 includes a hub body 85 and a clamp member 87 for clamping the recording tape T in an insertion recess 92 formed on the hub body 85.

The hub 86 also has an insertion slot into which a base end portion 94 of the power spring 90 is inserted. In order to insert the base end portion 94 into the insertion slot, the power spring 90 is bent to form a corner portion 96. The insertion recess 92 is positioned beyond the corner portion 96 in the tape winding direction P2 in FIG. 14.

In a state in which the power spring 90 is wound around the hub 86 by the magnetic tape T, the length of the power spring 90 is determined to position the leading end 98 of the power spring 90 beyond the corner portion 96 along the tape winding direction or toward the direction P2 in FIG. 14.

The leading end 98 of the power spring 90 is processed to be gradually thinner toward an end of the leading end 98 to prevent an uneven portion from being generated when the magnetic tape T is wound on the leading end 98. The leading end 98 is carefully processed not to cause a burr.

Operation of the second embodiment will now be explained.

In a state in which the magnetic tape cartridge is loaded in the drive system and the magnetic tape T is not wound, the leading end 98 of the power spring 90 is disposed slightly apart from the hub 86. The magnetic tape T clamped between the insertion recess 92 of the hub 86 and the clamp member 87 is extended from between the leading end 98 and the hub 86 (see FIG. 14).

When the reel 70 begins to be rotated by a drive system, the leading end 98 of the power spring 90 is forced toward a periphery 86S of the hub 86 by the magnetic tape T in contact with an outer peripheral surface of the power spring 90 (FIGS. 14 and 15).

With further rotation of the reel 70, the magnetic tape T is wound on an outer peripheral surface of the leading end 98. The leading end 98 of the power spring 90 becomes gradually thinner toward the end of the leading end 98. As a result, no uneven portion is formed on the portion T1 of the recording tape, which contacts the peripheral surface of the leading end 98. The leading end 98 formed in this way accordingly prevents an uneven portion from being generated on layers of the recording tape wound over the portion T1 (FIG. 16).

As described above, in the second embodiment, the power spring 90 is wound around the hub 86 by the magnetic tape T. An exterior portion of the corner portion 96, which is bent to be inserted into the hub 86, and an exterior portion of the clamp member 87 for holding the magnetic tape T in the insertion recess 92 are covered by the power spring 90, and the recording tape T is wound on the outside of the power spring 90. Accordingly, even if an uneven portion is formed due to the corner portion 96 or the clamping member 87, it does not generate a fold on the magnetic tape T.

An example has only been provided for a magnetic tape cartridge including a single reel, and the present invention is simply applicable to a cartridge including two reels. Further, the present invention is applicable to any reel around which a tape medium is wound.

Various modifications and alterations that do not depart from the scope and spirit of this invention will become apparent to those skilled in the art. The present invention is not to be unduly limited to the illustrative embodiments and example set forth above.

The present invention constructed as described above can provide a reel which can avoid an uneven portion on the recording tape, thereby preventing generation of an area incapable of having information recorded thereon or loss of recorded information.

What is claimed is:

1. A reel comprising a hub around which a recording tape is wound,
    wherein the hub includes a clamp portion and, a flexible member is fixed to the hub and wound on a peripheral surface of the hub by the recording tape wound on a peripheral surface of the flexible member, thereby covering the clamp portion of the hub.

2. The reel according to claim 1, wherein the flexible member is a spring.

3. The reel according to claim 2, wherein the clamp portion includes a recess and an insertion slot; and the spring comprises a receiving recess conforming to the recess, a base end portion inserted into the insertion slot, and a corner portion bent so that the base end portion can be inserted into the insertion slot.

4. The reel according to claim 3, wherein the spring includes a leading end and a length of the spring is determined such that the leading end extends beyond the corner portion and the receiving recess when the spring is wound around the hub by the recording tape.

5. The reel according to claim 4, wherein the spring is ground to be gradually thinner to toward the leading end of the spring.

6. The reel according to claim 1, wherein the clamp portion includes a recess and an insertion slot; and the flexible member comprises a receiving recess conforming to the recess, a base end portion inserted into the insertion slot, and a corner portion bent so that the base end portion can be inserted into the insertion slot.

7. The reel according to claim 6, wherein the flexible member includes a leading end and a length of the flexible member is determined such that the leading end extends beyond the corner portion and the receiving recess when the flexible member is wound around the hub by the recording tape.

8. The reel according to claim 7, wherein the flexible member is ground to be gradually thinner toward the leading end of the flexible member.

9. A reel comprising:
    a hub around which a recording tape is wound;
    a lower flange into which the hub is inserted; and
    an upper flange attached to the hub;
    wherein the hub includes a clamp portion, a flexible member is fixed to the hub and wound on a peripheral surface of the hub by the recording tape wound on the peripheral surface of the flexible member, thereby covering the clamp portion of the hub.

10. The reel according to claim 9, wherein the flexible member is a spring.

11. The reel according to claim 10, wherein the clamp portion includes a recess and an insertion slot, and the spring comprises a receiving recess conforming to the recess, a base end portion inserted into the insertion slot, and a corner portion bent so that the base end portion can be inserted into the insertion slot.

12. The reel according to claim 11, wherein the spring includes a leading end and a length of the spring is determined such that the leading end extends beyond the corner portion and the receiving recess when the spring is wound around the hub by the recording tape.

13. The reel according to claim 12, wherein the spring is ground to be gradually thinner toward the leading end of the spring.

14. The reel according to claim 11, wherein the lower flange has a generally fan-shaped groove, which is gradually narrowed toward the receiving recess of the flexible member, on an upper surface of the lower flange, and the groove includes a concave engagement recess substantially corresponding to a bottom portion of the receiving recess.

15. The reel according to claim 9, wherein the clamp portion includes a recess and an insertion slot, and the flexible member comprises a receiving recess conforming to the recess, a base end portion inserted into the insertion slot, and a corner portion bent so that the base end portion can be inserted into the insertion slot.

16. The reel according to claim 15, wherein the flexible member includes a leading end and a length of the flexible member is determined such that the leading end extends beyond the corner portion and the receiving recess when the flexible member is wound around the hub by the recording tape.

17. The reel according to claim 16, wherein the flexible member is ground to be gradually thinner toward the leading end of the flexible member.

18. The reel according to claim 15, wherein the lower flange includes a generally fan-shaped groove, which is gradually narrowed toward the receiving recess of the flexible member, on an upper surface of the lower flange, and the groove includes a concave engagement recess substantially corresponding to a bottom portion of the receiving recess.

19. The reel according to claim 9, wherein the hub and the lower flange are integrally formed.

20. The reel according to claim 9, wherein the hub and the upper flange are integrally formed.

* * * * *